US006538909B2

(12) United States Patent
Goodarzi et al.

(10) Patent No.: US 6,538,909 B2
(45) Date of Patent: Mar. 25, 2003

(54) UNIVERSAL HIGH EFFICIENCY POWER CONVERTER

(75) Inventors: Abas Goodarzi, Torrance, CA (US); Don Kang, Culver City, CA (US)

(73) Assignee: Enova Systems, Torrance, CA (US)

( * ) Notice: Subject to any disclaimer, the term of this patent is extended or adjusted under 35 U.S.C. 154(b) by 0 days.

(21) Appl. No.: 10/013,721

(22) Filed: Dec. 13, 2001

(65) Prior Publication Data

US 2002/0044468 A1 Apr. 18, 2002

(51) Int. Cl.[7] .............................................. H02M 7/155
(52) U.S. Cl. .............................. 363/98; 363/132; 363/17
(58) Field of Search ................................ 363/15, 17, 38, 363/78, 84, 89, 95, 98, 125, 131, 132; 323/255, 340

(56) References Cited

U.S. PATENT DOCUMENTS

| 4,387,331 A | * | 6/1983 | Kolosov et al. ............ 320/128 |
| 5,465,011 A | * | 11/1995 | Miller et al. ................. 307/64 |
| 5,481,449 A | * | 1/1996 | Kheraluwala et al. ........ 363/17 |
| 5,668,464 A | * | 9/1997 | Krein et al. ................. 323/259 |
| 5,747,972 A | * | 5/1998 | Baretich et al. ............ 323/223 |
| 6,157,168 A | * | 12/2000 | Malik .......................... 320/128 |
| 6,295,215 B1 | * | 9/2001 | Faria et al. ................... 363/37 |

* cited by examiner

Primary Examiner—Adolf Deneke Berhane
(74) Attorney, Agent, or Firm—Burns, Doane, Swecker & Mathis, L.L.P.

(57) ABSTRACT

A universal power converter for generating a regulated voltage, current or power with a large input voltage range. The power converter has a voltage boost function configured to boost the rectified input voltage and provide power factor correction. The power converter also includes a voltage chop function to chop the boosted voltage to form an AC voltage. The power converter further includes at least one relay in electrical communication with the AC voltage and a transformer. The primary winding has at least two inputs operative to selectively vary the voltage generated on a secondary winding thereof selected by the relay. Accordingly, the power converter can generate different voltages at the output based upon the position of the relay and the boosted voltage. The power converter provides maximum power operation at a wide output voltage range, maximizing the charging energy.

24 Claims, 2 Drawing Sheets

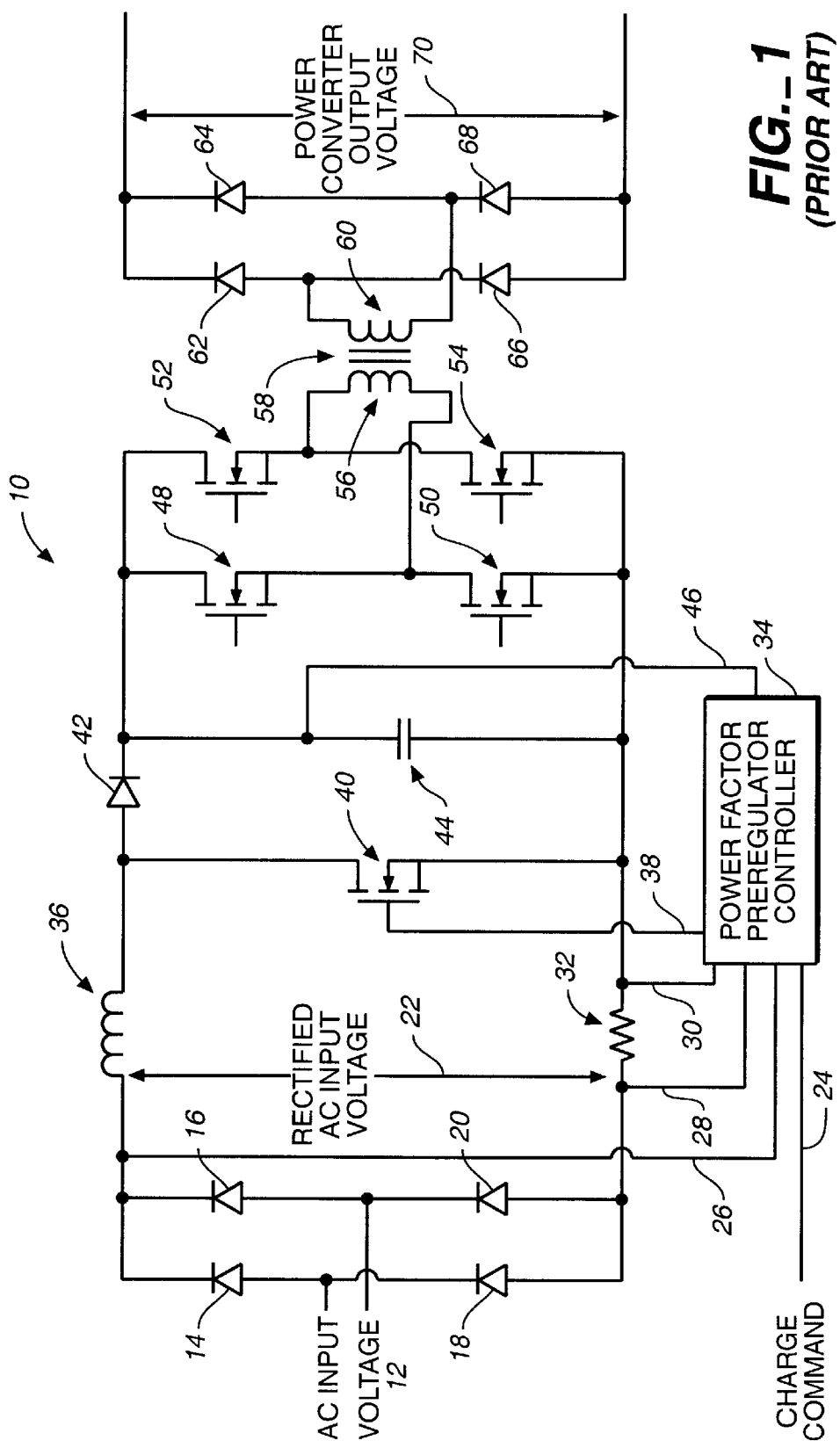
FIG._1 (PRIOR ART)

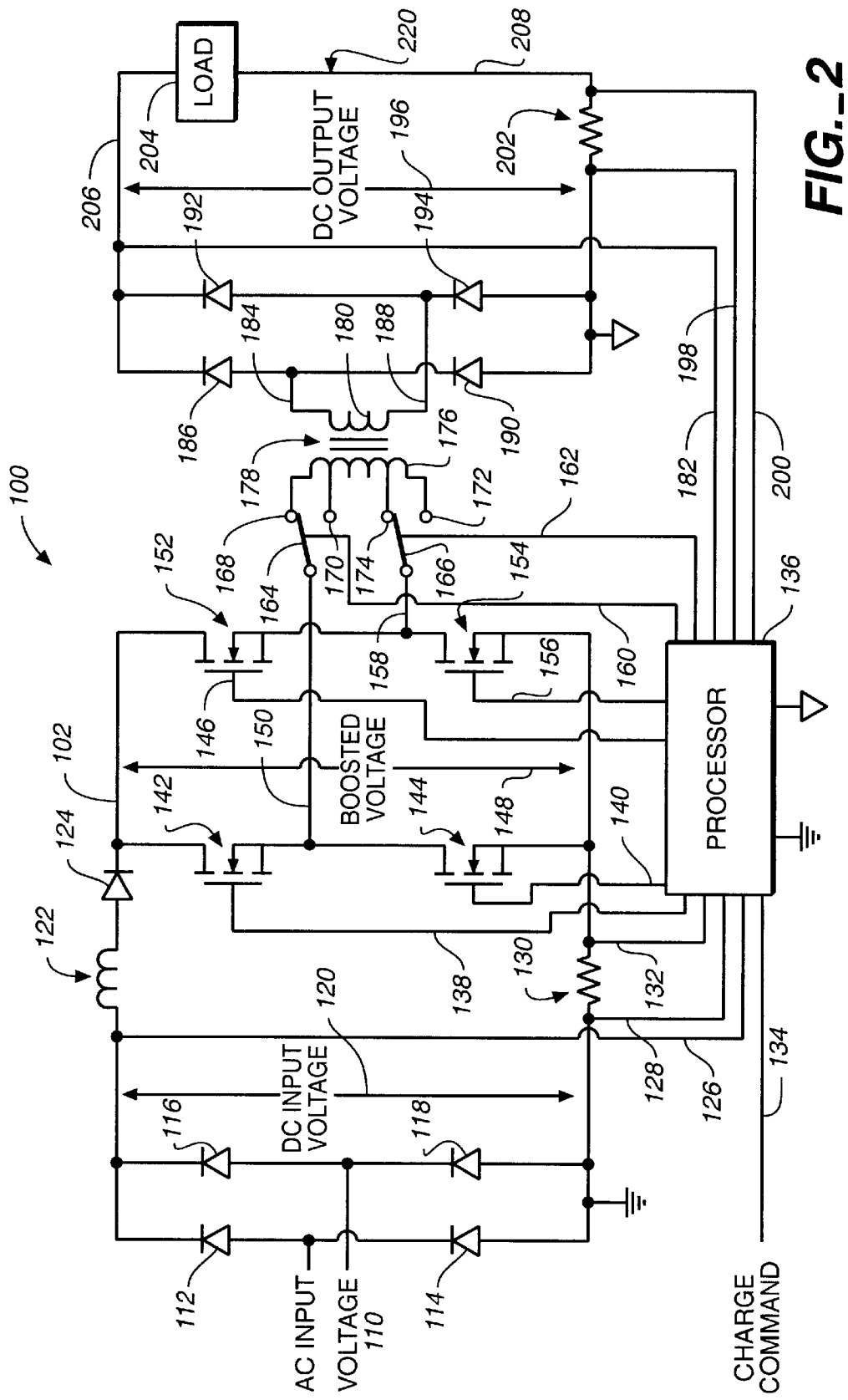
FIG._2

US 6,538,909 B2

UNIVERSAL HIGH EFFICIENCY POWER CONVERTER

BACKGROUND OF THE INVENTION

1. Field of Invention

The present invention relates generally to AC/DC power converters and more particularly to a high efficiency AC/DC power converter operative to produce regulated DC output power with utility AC power as the input source.

2. Status of the Prior Art

In a conventional AC/DC converter, power is usually delivered to a DC load or multiple DC loads at a constant rate. Due to the fundamental nature of a single-phase AC source, power drawn from such a source has a pulsating nature with an average value equal to the output power plus losses incurred by the converter. Accordingly, the AC/DC converter must provide means for storing and retrieving energy during each half-cycle of the AC line.

In the conventional AC/DC converter, large value capacitors are used for energy storage. The voltage present on these capacitors determines the output voltage of the AC/DC converter and is regulated. In other words, the regulated output voltage of the AC/DC converter is a linear function of the capacitor voltage. When the conventional converter is used in universal input applications where the input line voltage can vary from 108 Vac to 264 Vac it is not feasible to maintain a regulated capacitor voltage. In order to mitigate the need for an AC/DC converter with a regulated output voltage and a wide range of input voltages, multiple AC/DC power converter designs have been developed. These are generally multiple designs of a dual power processing stage AC/DC converter. The first power processing stage is generally the voltage boost stage consisting of an AC rectified input followed by a choke-boosted converter. The choke-boosted converter has a capacitor output to provide for the energy storage described earlier.

The capacitor output presents an equivalent DC voltage source to the second power processing stage. The capacitor output, used for storing and retrieving energy, is generally a high capacitance capacitor or capacitors that are expensive and large in volume. The transformer turns ratio and the regulated output voltage of the first power processing stage defines the regulated output voltage of the AC/DC converter. The second power processing stage is a DC/DC converter with a transformer-rectified output.

In addition to providing regulated DC output voltage, the first power processing stage may provide for power factor correction (PFC). The second power processing stage accepts the regulated DC voltage from the first power processing stage and provides for input to output voltage amplification (via the transformer turns ratio) and galvanic isolation. Because of the large variations in utility voltages that exist in the global market place (i.e., 108 Vac to 264 Vac), a single conventional AC/DC converter design cannot process the full input voltage range and provide for the desired regulated output voltages. Accordingly, different converter designs are used to satisfy different portions of the input voltage range. As such, the AC/DC converter design for 120 Vac input will be different than that for 240 Vac input. Specifically, due to large variations in worldwide household and commercial AC power sources, multiple designs for the AC/DC converter are available. Furthermore, the desire for unity power factor by utility companies, the requirement for galvanic isolation for safety, and the large differences in application usage of power converter creates application specific designs. For example, conventional AC/DC power converters for battery chargers are designed for the specific application. The input voltage, as well as the output voltage requirements, are taken into considerations in the design process. Accordingly, the design of a conventional AC/DC converter for a given battery pack will change according to different AC input voltage sources.

The present invention addresses the above-mentioned deficiencies in AC/DC power converter designs by providing a single power converter design which can accept universal input voltages (i.e., 108 Vac to 264 Vac) and provide regulated DC output with a large voltage range. The invention is primarily an AC/DC power converter utilizing universal utility power to charge a battery pack. A battery pack is a group of batteries connected in series or series-parallel. The present invention operates using a single power processing stage, and provides power factor correction (PFC), input to output isolation (galvanic), and sine square output power. With the aid of relay(s) and a tapped transformer, the single stage AC/DC power converter of the present invention accepts input voltages of a global range (i.e., 108 Vac to 264 Vac) and provides regulated DC power with a large output voltage and power range capability, (i.e., 0 to 6 kW). The proposed invention provides constant power operation at large battery voltage range. For higher output power requirements, the multiple AC/DC power converters of the present invention can be operated in parallel or multiphase configuration without more effort than connecting the inputs and outputs accordingly. The AC/DC power converter of the present invention maintains a single design with higher efficiency, lower cost, and smaller volume than the conventional AC/DC power converters serving the same function.

SUMMARY OF THE INVENTION

In accordance with the present invention, there is provided a universal AC/DC power converter for generating regulated DC output power with large voltage range from a varying AC input voltage source of a global range (i.e., 108 Vac to 264 Vac). The AC/DC power converter has a single power processing stage, at least one relay in electrical communication with the output of the single power processing stage, a transformer in electrical communication with the relay, an output rectifier network in electrical communication with the output of the transformer, and a processor that contains the control for logic of the AC/DC power converter. The single power processing stage includes an input rectifier network to rectify the AC input voltage to a DC input voltage, and a voltage boost function to increase the DC input voltage to a higher regulated voltage defined herein as the boosted voltage. The boosted voltage is the regulated output voltage of the voltage boost function. The voltage boost function entails at least one inductor, at least one diode, at least four switching devices, an input current transducer, and the function of the processor. The four switching devices may be transistors such as power MOSFET's or IGBT's, and the input current transducer may be a sense resistor. In addition to the voltage boost function, the single power processing stage includes a voltage chop function that chops the boost voltage to form AC voltage. This AC voltage is in electrical communication with the transformer via the relays. The electrical components that make up the voltage chop function are some of the same components that make up the voltage boost function. For this reason the voltage boost function and the voltage chop function are defined as a single integrated power processing stage.

The relay (or relays) in electrical communication with the output of the single power processor stage is configured with at least two switching positions operated by the processor. The transformer (in electrical communication with the relays) has a primary winding and at least one secondary winding. The primary winding has at least two inputs operative to selectively vary the voltage generated on the secondary winding from the position of the relays. Alternatively, the relays can also be located on the secondary winding of the transformer without altering the intended function of the invention. Finally, an output rectifier network (in electrical communication with the transformer secondary winding) converts the AC voltage to DC voltage. The relays can selectively change the output DC voltage range of the AC/DC power converter by choosing the inputs of the transformer.

In accordance with the present invention, the AC/DC power converter includes a processor. The processor contains the control logic for the AC/DC power converter and may include a microprocessor and a power factor preregulator circuit. The processor is in electrical communication with the DC input voltage and the DC output voltage. The processor is operative to selectively position the relay or relays in response to the DC input voltage and the DC output voltage. In this sense, the processor directs the relays into a position that sets the AC/DC power converter into the proper output voltage range to charge a battery pack connected to its output. In addition to the DC input voltage and the DC output voltage, the processor may be in electrical communication with the input current transducer to perform the power factor correction function. The input current transducer may be a sense resistor or isolated current sensor. In addition to the processor, the sense resistor is in electrical communication with the switching devices and the input rectifier network. The processor also contains a logic circuit to perform the voltage boost function and the voltage chop function. In addition to the DC input voltage, the DC output voltage, and the input current transducer, the processor is in electrical communication with the output current transducer, and at least one external charge command to increase and regulate the DC input voltage to produce the boosted voltage. The output current transducer is also in electrical communication with the output rectifier network.

The processor is in electrical communication with the four switching devices. The four switching devices are modulated on and off by the processor in accordance with the external charge command for level charging, and for voltage, or current, or power modes of regulation. The processor may be preprogrammed to accept the DC input voltage data, input current data, output voltage data, output current data, and modulate the on and off time of the four switching devices to boost and regulate the DC input voltage as dictated by the external charge command for output voltage regulation, or output current regulation, or output power regulation.

The voltage chop function of the single power processing stage entails the four switching devices. The four switching devices are connected in an "H" bridge configuration and switched at a fixed frequency. During the voltage boost function the processor commands all four switching devices on for a portion of the period followed by turning off two of the switching devices for the remaining period. The two switching devices are two diagonal devices of the H-bridge. The processor determines the switching device operating duty for the voltage boost function. The duty is defined as the switching device on time divided by the on time plus the off time of the given period. The processor (in electrical communication with the external charge command, the DC input voltage, and DC output voltage) computes the duty for the four switching devices. As for the voltage chop function, the processor alternately sequences the diagonal switching devices of the "H" bridge on and off at a time when all four switches are not on. This complex switching sequence of the four switching devices will be described in more detail. The voltage boost function in conjunction with the voltage chop function boost the DC input voltage to a higher regulated voltage, herein defined as the boosted voltage and electrically chop it to form the AC voltage. The output of the single power processing stage is a regulated AC voltage with its amplitude consistent with the external charge command. This AC voltage is in electrical communication with the primary winding of a transformer via the relays. The inputs of the transformer may have primary inputs, tap inputs, or primary and tap inputs.

In the preferred embodiment, the AC/DC power converter is configured to produce regulated DC output power that is operative to charge at least one battery pack. In the preferred embodiment, the processor may be in electrical communication with the DC input voltage and the DC output voltage in order to determine the output voltage. The processor determines whether the inputs to the transformer should be the primary inputs, or tap inputs, or primary and tap inputs. As will be recognized by those of ordinary skill in the art, the transformer may include multiple taps for generating different secondary AC voltages therefrom and corresponding output DC voltages. The output rectifier network is in electrical communication with the secondary winding of the transformer. The transformer secondary AC voltage is rectified to form the DC output voltage.

In accordance with the present invention, there is provided a method of converting an unregulated AC input voltage into a regulated DC output with large voltage range, with an AC/DC power converter having a single power processing stage, at least one relay, a transformer with multiple inputs, an output rectifier network, and an output current transducer. The method comprises applying an unregulated AC input voltage to the input rectifier network of the single power processing stage to produce an unregulated DC input voltage. The unregulated DC input voltage is applied to a voltage boost function of the single power processing stage. The voltage boost function boosts the unregulated DC input voltage to form a regulated boosted voltage defined as the boosted voltage. A voltage chop function of the single power processing stage applies the boosted voltage to the input of the transformer via the relay(s) in an alternating sequence accomplished by sequentially switching the four switching devices. The result is the single power processing stage generates a regulated AC voltage output via the relays to the input of the transformer. The relay(s) select the transformer inputs for the application of the regulated AC voltage. The four switching devices are in electrical communication with the relay(s) and are operative by the processor. The processor modulates the on and off time of the four switching devices. With the four switching devices being modulated, the voltage to the input of the transformer is a regulated AC voltage. This regulated AC voltage is induced into the secondary winding of the same transformer. The output rectifier network is in electrical communication with the secondary winding of the transformer. The regulated AC voltage induced onto the transformer secondary is rectified by the output rectifier network to form a regulated DC voltage that is the AC/DC power converter output. Depending on the external charge command (in electrical communication with the processor), the AC/DC power converter output may be voltage regulated, current regulated, or power regulated.

BRIEF DESCRIPTION OF THE DRAWINGS

These, as well as other features of the present invention, will become more apparent upon reference to the drawings wherein:

FIG. 1 is a circuit diagram for a Prior Art AC/DC Power Converter; and

FIG. 2 is a circuit diagram for an AC/DC Power Converter constructed in accordance with the present invention.

DETAILED DESCRIPTION OF THE INVENTION

Referring now to the drawings wherein the showing are for the purposes of illustrating a preferred embodiment of the present invention only, and not for purposes of limiting the same, FIG. 1 is a circuit diagram of a prior art AC/DC power converter 10. The prior art AC/DC power converter 10 is a two-stage power processor with a first power processor stage as a boost converter and a second power processor stage as a DC-DC converter. The prior art AC/DC power converter 10 has a bridge rectifier network input consisting of diodes 14, 16, 18, and 20 operative to rectify an AC input voltage 12 from a utility line. The bridge rectifier network is in electrical communication with an inductor 36. The term inductor and choke may be used interchangeably herein. The boost converter consists of an inductor 36 in electrical communication with switching device 40 and the anode of diode 42. The cathode of diode 42 is in electrical communication with a capacitor 44. The positive terminal of a current transducer 32 is in electrical communication with the switching device 40, the capacitor 44, and a power factor pre-regulator controller 34. A negative terminal of the current transducer 32 is in electrical communication with the diodes 18 and 20, and the power factor controller 32.

Energy from the AC input voltage 12, and the inductor 36 are stored in the capacitor 44 via the diode 42 during the boost period, when switching device 40 is off. The increase in energy in the capacitor 44 boosts the voltage of capacitor 44. The DC-DC converter, (i.e., the second power processing stage) retrieves energy from capacitor 44 when switching device 40 is on. During this period, the current from AC input voltage 12 increases. The increasing current flows from the AC input voltage 12 through diode 14, through inductor 36, switching device 40, input current transducer 32, and diode 20. Increasing current through inductor 36 results in increasing energy stored in inductor 36.

Voltage boosting with power factor correction is operative by power factor pre-regulator controller 34. The power factor pre-regulator controller 34 is in electrical communication with the voltage of capacitor 44 via line 46, a rectified AC input voltage 22 via line 26, and the input current transducer 32 via lines 28 and 30, as shown in FIG. 1.

The prior art AC/DC power converter 10 may include an external charge command 24 in electrical communication with the power factor pre-regulator controller 34 in order to dictate the level of charging. The power factor pre-regulator controller 34 senses the capacitor 44 voltage via line 46 and the rectified AC input voltage 22 via line 26, and the input current via lines 28 and 30. Upon receiving the external charge command 24, the power factor pre-regulator controller 34 modulates the on and off time of switching device 40 via line 38 to achieve a regulated boosted voltage across capacitor 44. The on and off modulation of switching device 40 determines the energy stored in the inductor 36 and the energy released to the capacitor 44 via diode 42, respectively. The energy from the inductor 36 released to the capacitor 44 determines the boosted voltage on capacitor 44. The voltage across capacitor 44 is regulated by the power factor pre-regulator 34 to the level defined by the external charge command 34.

Switching devices 48, 50, 52, and 54, transformer 58, and the diodes 62, 64, 66, and 68 form the second power processing stage, (i.e., the DC-DC converter). Switching devices 48, 50, 52, and 54 are connected in an H-bridge configuration as shown in FIG. 1 and are in electrical communication with capacitor 44 and a primary winding 56 of transformer 58. Switching devices 48, 50, 52, and 54 may be transistors, such as MOSFET's that are switched on and off at a 50% duty cycle at a fixed frequency. Herein, the duty is defined as the switching device on time divided by the switching device on time plus the off time. The four switching devices 48, 50, 52, and 54 are switched on and off in such a sequence to form an AC voltage. This AC voltage is in communication with the primary winding of transformer 58. The presence of the AC voltage on the primary winding 56 of transformer 58 induces a voltage of the same kind onto the secondary winding 60 of the same transformer 58, but of a different amplitude. The difference in amplitude is a function of the turns ratio of transformer 58. Herein, the transformer turns ratio is defined as the transformer primary turns divided by the transformer secondary turns.

In electrical communication with the secondary winding 60 of transformer 58 is a bridge rectifier network having diodes 62, 64, 66, and 68 that rectify the AC voltage from the secondary winding 60 to produce a DC voltage. The DC voltage is the AC/DC power converter 10 output voltage 70. In this respect, the power converter output voltage 70 of the prior art AC/DC power converter 10 is the secondary winding 60 voltage rectified by the diodes 62, 64, 66, and 68. The power converter output voltage 70 is defined by the regulated voltage across capacitor 44, which is controlled by the power factor pre-regulator controller 34, as previously explained. The power converter output voltage 70 of the prior art AC/DC power converter 10 is the regulated voltage across capacitor 44 amplified by the transformer 58 turns ratio.

The prior art AC/DC power converter 10 may provide power factor correction, regulated DC output voltage, and input to output isolation. However, as previously discussed, the prior art AC/DC power converter 10 cannot adequately provide for wide range of regulated DC output voltage for the total range of global AC input voltages 12 (i.e., 108 Vac to 264 Vac). To cover this wide range of AC input voltages and output DC voltages different prior art AC/DC power converter designs are required. Primarily, the turns ratio of transformer 58 must be changed to accommodate the wide range of AC input voltage. Meaning, transformer 58 would require a different transformer turns ratio if its AC input voltage to the AC/DC power converter 10 is 120 Vac verses 240 Vac.

Referring to FIG. 2, an AC/DC power converter 100 constructed in accordance with the present invention is shown. The AC/DC power converter 100 has a single power processing stage 102, two relays 164 and 166 in electrical communication with the output of the single power processing stage, a transformer 178 in electrical communication with the relays 164, and 166, an output rectifier network consisting of rectifiers 186, 190, 192, and 194 in electrical communication with the output of the transformer 178, an output transducer 202 in electrical communication with rectifiers 190 and 194, and a processor 136 that contains the control and logic for the AC/DC power converter 100. The single power processing stage 102 contains an input rectifier network consisting of rectifiers 112, 114, 116, and 118, a voltage boost function, a voltage chop function, and an input current transducer 130, such as a sense resistor. The input rectifier network consisting of rectifiers 112, 114, 116, and 118 rectifies an unregulated AC input voltage 110 to an unregulated DC input voltage 120. The voltage boost function consists of a choke 122, a diode 124, four switching devices 142, 144, 152, and 154, and the function of the processor 136. The electrical components that make up the voltage chop function are the four switching devices 142, 144, 152, and 154, and the processor 136. These are the same components required by the voltage boost function, and for that reason both the voltage boost function and the voltage chop function constitute a single power processing stage.

Rectifiers 112 and 116 are in electrical communication with the inductor 122 that is in electrical communication with the anode of diode 124. The cathode of diode 124 is in electrical communication with the drain of switching devices 142 and 152. The source of switching devices 142 and 152 are in electrical communication with the drain of switching devices 144 and 154, respectively. The terms drain, source, and gate are consistence with MOSFET switching devices. The source of switching devices 144 and 154 are in electrical communication with the positive terminal of the input current transducer 130. The negative terminal of the input current transducer 130 is in electrical communication with the anode of rectifiers 114 and 118. The voltage developed across the drain of switching device 142 and the source of switching device 144 can be identified as boosted voltage 148.

The processor 136 may contain a power factor pre-regulator and/or a microprocessor. The processor 136 is in electrical communication with the DC input voltage 120 via line 126, input current transducer 130 via lines 128 and 132, and a DC output voltage 196 via line 182. The processor 136 controls the operation of relays 164 and 166 via lines 160 and 162, respectively, as will be further explained. In addition, the processor 136 is in electrical communication with an external charge command 134 and the processor 136 controls the on and off operation of switching device 142 via line 138, switching device 144 via line 140, switching device 152 via line 146, and switching device 154 via line 156. The switching devices 142, 144, 152, and 154 along with inductor 122, diode 124, sense resistor 130, and processor 136 perform multiple functions such as:

1. The processor 136 modulates the on and off time of the four switching devices 142, 144, 152, and 154 to boost the DC input voltage 120 to a higher regulated voltage identified as the boosted voltage 148 per the charge command 134;
2. The processor 136 modulates the on and off time of the four switching devices 142, 144, 152, and 154 to provide for input power factor correction; and
3. The processor 136 modulates the on and off time of the four switching devices 142, 144, 152, and 154 to electrically chop the boosted voltage 148 to generate an AC voltage for transformer application.

The operating frequency of the four switching devices 142, 144, 152, and 154 is fixed and synchronized. The detailed operation of the four switching devices 142, 144, 152, and 154 can best be described by illustrating the operation in four separate quadrants. The first and third quadrants are of equal time duration; the second and fourth quadrants are of equal time duration. The first and third quadrants perform the boost function that determine the voltage level of the boosted voltage 148; the second and fourth quadrants perform the chop function. The boosted voltage 148 is electrically chopped to form AC voltage for transformer application.

First Quadrant:

All four switching devices 142, 144, 152, and 154 are switched on and are saturated. The on time duration of the switching devices 142, 144, 152, and 154 is a function of the required energy stored in choke 122, and is determined by the processor 136 and the external charge command 134. During this period, increasing current flows from the AC input voltage 110 through the rectifier 112, through the choke 122, through the diode 124, through the four switching devices 142, 144, 152, and 154, through the input current transducer 130, and rectifier 118. Stored energy builds up in the choke 122 as the current increases. The on condition of the four switches 142, 144, 152, and 154 thereby shorts the primary winding 176 of transformer 178 via relays 164 and 166. No voltage is present across the primary winding 176 of transformer 178 and thus no voltage is induced across the secondary winding 180 of transformer 178. Accordingly, during this quadrant no power is transferred from the AC input voltage 110 to a load 204 connected to an output 220 of the AC/DC power converter 100. The load 204 may be a battery pack.

Second Quadrant:

Two switching devices 152 and 144 are turned off. The other two switching devices 142 and 154 remain on and saturated. Primary winding 176 of transformer 178 is no longer shorted. Due to the load 204 reflected back onto the primary winding 176 of transformer 178, decreasing current now flows from the AC input voltage 110 through rectifier 112 through choke 122, diode 124, switching device 142, relay 164, primary input 168, through winding 176 of transformer 178, tap 174, relay 166, switching device 154, input current transducer 130, and rectifier 118. Choke 122 releases energy due to the decreasing current and boost the voltage, defined as boosted voltage 148. The boosted voltage 148 is applied across the primary winding 176 of transformer 178 via switching devices 142 and 154, and relays 164 and 166. The boosted voltage 148 is transformed to the secondary winding 180 via the transformer action. Current flows from the secondary winding 180 of transformer 178 through diode 186 to the load 204 and returns through the output current transducer 202 and diode 194. The output current transducer 202 may be a sense resistor. During this quadrant, power is transferred from the AC input voltage 110 and the choke 122 to the AC/DC power converter load 204.

Third Quadrant:

All four switching devices 142, 144, 152, and 154 are switched on and are saturated. The on time duration of the switching devices 142, 144, 152, and 154 is the same duration as that in the first quadrant. During this period the primary winding 176 is shorted via the on condition of the four switching devices 142, 144, 152, and 154, and the relays 164 and 166. Increasing current now flows from the AC input voltage 110 through rectifier 112, choke 122, diode 124, and through the four switching devices 142, 144, 152, and 154, the input current transducer 130, and rectifier 118. Stored energy builds up in choke 122 as the current increases. The four switches 142, 144, 152, and 154 short the primary winding 176 of transformer 178, and no voltage is induced across the secondary winding 180 of transformer 178. Accordingly, during this quadrant no power is transferred from the AC input voltage 110 to the load 204.

Fourth Quadrant:

The two switching devices 142, and 154 are turned off. The other two switching devices 152 and 144 remain on and saturated. Primary winding 176 of transformer 178 is no longer shorted. Due to the load 204 reflected back onto the primary winding 176 of transformer 178, decreasing current now flows. The decreasing current flows from the AC input voltage 110 through the rectifier 112, through choke 122, diode 124, switching device 152, relay 166, tap 174, through primary winding 176 of transformer 178, primary input 168, relay 164, switching device 144, input current transducer 130, and rectifier 118. Note that during the second quadrant, current flows into the primary winding 176 of transformer 178 via primary input 168 and exits through tap 174. In this fourth quadrant, current flows into the primary winding 176 of transformer 178 via tap 174 and exits through primary input 168. This reversal of current flow between the second and fourth quadrants presents an alternating voltage (AC voltage) across the primary winding 176 of transformer 178, and resets the transformer core. Resetting the transformer core is a necessary action for transformer operation. Choke 122 releases energy due to the decreasing current and boosts the voltage (boosted voltage 148) to a higher level as is commonly known in choke operation. This higher voltage (boosted voltage 148) is applied across the primary winding 176 of transformer 178 via switching devices 152 and 144, and relays 166 and 164, as described earlier. The boosted voltage 148 is transformed to the secondary winding 180 of transformer 178 via transformer action. Current flows from the secondary winding 180 of transformer 178 through diode 192 to the load 204 and returns through output current transducer 202 and diode 190. During this quadrant, power is transferred from the AC input voltage 110 and the choke 122 to the AC/DC power converter load 204.

The operation of the four switching devices described in the four quadrants performs the following functions:

1. Conditions the AC input current for power factor correction;
2. Boosts the DC input voltage 120 to a regulated voltage identified as boosted voltage 148; and
3. Electrically chops the boosted voltage 148 for transformer 178 application.

The above three (3) functions just described are accomplished by modulating the on and off time of switching devices 142, 144, 152, and 154 via the processor 136 at some fixed frequency and sequence. The modulation is determined by the processor 136 and is a function of the external charge command 134, DC input voltage 120, the input current sensed via lines 128 and 132, the DC output voltage 196, and the output current sensed via lines 198 and 200.

As previously mentioned, the AC/DC power converter 100 includes a transformer 178 having a primary winding 176 and a secondary winding 180. An AC voltage applied across the primary winding 176 will induce an AC voltage across the secondary winding 180 of the same kind, but may be of different amplitude depending on the turns ratio of transformer 178, as is commonly known in the electrical operation of transformers. The primary winding 176 of transformer 178 has primary connections 168 and 172 wherein the entire primary winding 176 will be used. Additionally, the primary winding 176 has taps 170 and 174 which are used for isolating sections of the primary winding 176, as is commonly known in the art of transformer design. Accordingly, by applying an AC voltage across different pairs of the primary and tap connections 168, 172, 170, and 174, it is possible to change the voltage induced in the secondary winding 180 of transformer 178.

Referring to FIG. 2, the source of switching device 142 is electrically connected to the drain of switching device 144. The terms source, drain, and gate of the switching devices are consistence with MOSFET switching devices, however it will be recognized that other types of switching devices may be used interchangeably. Connected between the switching devices 142 and 144 (i.e., between the source of switching device 142 and drain of switching device 144) is a first lead 150 that is connected to the first relay 164. The first relay 164 is operative to switch the first lead 150 between the primary connection 168 and the tap connection 170 of the primary winding 176. The switching operation of the first relay 164 is controlled by the processor 136 via line 160. As such, the processor 136 can switch the first lead 150 from the primary connection 168 to the tap connection 170, as will be further explained below.

Similarly, a second lead 158 is connected between the source of switching device 152 and the drain of switching device 154. The second lead 158 is connected to a second relay 166 that is operable to switch between the tap connection 174 and the primary connection 172 of the primary winding 176. The second relay 166 is controlled via control line 162 from processor 136. In this respect, the processor 136 can switch the second lead 158 from the tap connection 174 to the primary connection 172.

In order to determine the proper switching operation of the first relay 164 and second relay 166, the processor 136 contains a preprogrammed algorithm. The processor 136 in electrical communication with the DC input voltage 120 and the DC output voltage 196 operates relays 164 and 166 via lines 160 and 162, respectively, per the preprogrammed algorithm. In other words, the processor 136 controls the operating range of the AC/DC power converter 100 by monitoring the DC input voltage 120, and the DC output voltage 196, and applying the monitored voltages to a preprogrammed algorithm in the processor 136 to position relays 164 and 166.

Additionally, the processor 136 is in electrical communication with the gates of switching devices 142, 144, 152, and 154 via lines 138 140, 146, and 156, respectively, in order to control the operation thereof. Specifically, the processor 136 controls the operation of the switching devices 142, 144, 152, and 154 to charge the load 204 to levels dictated by charge command 134. The charge command 134 is an external command that may be issued by the user or another control unit to command the AC/DC power converter 100 to charge the load 204 (battery pack) to a specific current level, voltage level or power level. The processor 136 accepts the charge command 134 and adjusts the on and off time of switching devices 142, 144, 152, and 154 to achieve the charge level dictated by the charge command 134 while maintaining input power factor correction by virtue of the power factor pre-regulator in the processor 136.

Referring to FIG. 2, the secondary winding 180 of the transformer 176 has a first output 184 and a second output 188. The first output 184 is in electrical communication with the anode of diode 186 and the cathode of diode 190. Similarly, the second output 188 is in electrical communication with the anode of diode 192 and cathode of diode 194. The cathode of diodes 186 and 192 are in electrical communication with the load 204 via lead 206. The positive terminal of the output current transducer 202 is in electrical communication with load 204 via lead 208. The negative terminal of output current transducer 202 is in electrical communication with the cathode of diodes 190 and 194. In this respect, the diodes 186, 190, 192, and 194 form a bridge rectifier network operative to rectify the AC voltage from secondary winding 180 of transformer 178 to a DC output voltage 196.

In accordance with the present invention, the preferred method of operating the AC/DC power converter 100 includes charging a battery pack with an AC input voltage 110 and an external charge command 134. The battery pack being the load 204 and in electrical communication with the output 220 of the AC/DC power converter 100. Alternatively, the load 204 can be any electrical device that needs regulated DC power. The AC input voltage 110 is rectified by the rectifier network consisting of diodes 112, 114, 116, and 118 to form DC input voltage 120 as shown in FIG. 2. As previously mentioned, the AC input voltage 110 can vary from location to location. Specifically, the AC input voltage 110 varies from country to country. The processor 136 senses the DC input voltage 120 via line 126 and DC output voltage 196 via line 182 and selects the positions of relays 164 and 166 via lines 160, and 162, respectively. A preprogrammed algorithm in the processor 136 determines the selections of the different relay positions to determine the operating range of the AC/DC power converter 100. The preprogrammed algorithm takes into account the voltages, DC input voltage 120, and DC output voltage 196 in making the selections. After positioning relays 164 and 166, the processor 136 in electrical communication with the charge command 134, the input current transducer 130 via lines 128 and 132, and the output current transducer 202 via lines 198 and 200, modulates the on and off times of switching devices 142, 144, 152, and 154 via lines 138, 140, 146, and 156, respectively, to a duty that is consistent with the charge command 134. The DC input voltage 120 is thus boosted by the modulation of switching devices 142, 144, 152, and 154 to a voltage defined as the boosted voltage 148. This boost function is defined as the voltage boost function and its circuit consists of inductor 122, diode 124, four switching devices 142, 144, 152, and 154, input transducer 130, and the function of processor 136. The output of the voltage boost function circuit is a regulated output voltage identified as the boosted voltage 148. The switching devices 142, 144, 152, and 154, and the function of the processor 136, also perform the voltage chop function, which converts the regulated DC boosted voltage 148 to an AC voltage. This AC voltage is in electrical communication with the primary winding 176 of transformer 178 via relays 164 and 166. The voltage across the primary winding 176 of transformer 178 is induced into the secondary winding 180. The boosted voltage 148 is regulated at a level such that the DC output voltage 196 developed by the secondary winding 180 of transformer 178, and rectified by diodes 186, 190, 192, and 194, is adequate to supply the current level to the load 204 that is consistent with the charge command 134. The voltage chop function electronically chops the boosted voltage 148 for transformer application. This operation was described earlier in the four-quadrant section.

The relays 164 and 166 are in electrical communication with primary winding 176 of transformer 178 through primary connections 168 and 172, and taps connections 174 and 172. The processor 136, as previously described, selects the positions of the relays 164 and 166. The processor 136 is in electrical communication with the DC input voltage 120 via line 126 and the power converter DC output voltage 196 via line 182 and activates relays 164 and 166 via lines 160 and 162, respectively, to a preprogrammed algorithm in the processor 136. The processor 136 monitors AC/DC power converter 100 input voltage, DC input voltage 120, and DC output voltage 196, and positions the relays 164, and 166 as required to set the AC/DC power converter 100 to proper operating range to charge the load 204. This feature enables the AC/DC power converter 100 to charge a battery pack load 204 with universal input voltage (108 Vac to 264 Vac).

More particularly, with the AC/DC Power Converter 100 output in communication with a battery pack as the load 204, and its input in communication with an utility AC input voltage 110 as the source, and a prescribed charge command 134 at the processor 136, the processor 136 senses the DC input voltage 120 via line 126, and the DC output voltage 196 (battery pack voltage) via line 182 and positions relays 164 and 166 via lines 160, and 162, for proper transformer tap positions determined by a preprogrammed algorithm in the processor 136. Then the processor 136 acknowledges the charge command 134 and modulates the on and off time of switching devices 142, 144, 152, and 154 to boost the DC input voltage 126 to a regulated boosted voltage 148, consistent with the charge command 134. In addition, the modulation of switching devices 142, 144, 152, and 154 electronically chop the boosted voltage 148 as previously described and apply it to the primary winding 176 of transformer 178 via relays 164 and 166 as previously described. The transformed voltage at secondary winding 180 of transformer 178 is rectified by diodes 186, 190, 192, and 194. The DC output voltage 196 generated from diodes 186, 190, 192, and 194 is the regulated DC output voltage 196 of the AC/DC power converter 100. The regulated DC output voltage 196 is at a level that is consistent with the charge command 134.

Additional modifications and improvements of the present invention may be apparent to those of ordinary skill in the art such as providing different configurations for the single power processing stage. Thus, the particular combination of parts described and illustrated herein is intended to represent only certain embodiments of the present invention, and is not intended to serve as limitations of alternative devices within the spirit and scope of the invention.

What is claimed is:

1. A universal power converter for generating a regulated wide range output DC voltage from a variable input voltage, the power converter comprising:

a voltage boost function to boost the rectified input voltage;

a voltage chop function to electronically chop the boosted voltage;

at least one relay in electrical communication with the chopped boosted function, the relay having at least a first and second position;

a transformer in electrical communication with the relay, the transformer having a primary winding and at least one secondary winding, the primary winding having at least two inputs being operative to selectively vary the voltage generated on the secondary winding(s) from the position of the relay; and a rectifier in electrical communication with the transformer, the rectifier being operative to generate the output voltage from the secondary winding(s) of the transformer.

2. The power converter of claim 1 further comprising a processor in electrical communication with the output voltage and the input voltage, the processor being operative to selectively position the relay in response to the output and input voltages.

3. The power converter of claim 2 wherein the power converter is configured with power factor correction conversion.

4. The power converter of claim 3 wherein the processor is in electrical communication with a rectified input voltage, the output voltage, and an input current transducer in order to control the power factor correction conversion.

5. The power converter of claim 4 wherein the boost voltage function comprises at least one inductor, at least one diode, and at least four switching devices in order to boost the rectified input voltage.

6. The power converter of claim 5 wherein the processor is in electrical communication with a charge command and is configured to position the relays in order to generate the output voltage to charge at least one battery pack.

7. The power converter of claim 6 wherein the at least two inputs of transformer are a primary input and a tap input of the transformer.

8. The power converter of claim 7 wherein the rectifier is a bridge rectifier network that rectifies the transformer secondary voltage.

9. The power converter of claim 1 wherein the at least two inputs are a primary input and a tap of the transformer.

10. The power converter of claim 7 further comprising at least four switching devices to provide power factor correction conversion and voltage chopping.

11. A method of converting a variable input voltage to a regulated output voltage different from the input voltage with a power converter having a single power processing stage, a relay, a transformer with multiple inputs, and an output rectifier, the method comprising the steps of:
 a) applying a rectified input voltage to the input of the single power processing stage;
 b) increasing the rectified input voltage with a boost voltage function of the single power processing stage to generate a boosted voltage;
 c) applying the boosted voltage to a voltage chop function of the single power processing stage to produce an AC voltage to the relays;
 d) selecting the inputs of the transformer with the relays;
 e) apply the AC voltage from the output of the single power processing stage to the transformer; and
 f) inducing the output voltage on the transformer from the AC voltage applied to the transformer.

12. The method of claim 11 wherein step (b) further comprises boosting the rectified input voltage with power factor correction.

13. The method of claim 12 wherein the power converter further includes a processor in electrical communication with the relay, the rectified input voltage and the output voltage, and step (d) comprises the processor selecting the inputs of the transformer with the relays.

14. The method of claim 13 wherein the processor controls the operation of current regulation, voltage regulation and power regulation.

15. The method of claim 13 wherein the processor controls the operation over a wide input AC voltage and output DC voltage while delivering the full rated power.

16. The method of claim 13 wherein the processor controls and tracks the maximum operation power to reduce the charge time.

17. The method of claim 13 wherein the processor controls the operation of the power factor correction function, the voltage boost function, and the voltage chop function of the single power processing stage.

18. The method of claim 11 further comprising the step of:
 g) rectifying the output voltage from the transformer with an output rectifier.

19. The method of claim 18 wherein step (g) comprises rectifying the transformer output voltage with a rectifier bridge network.

20. The method of claim 11 wherein step (f) comprises inducing an output voltage that is configured to charge a battery pack.

21. The method of claim 11 wherein step (a) comprises applying a rectified AC input voltage to the boost voltage function of the single power processing stage.

22. A method of converting an universal AC input voltage to a regulated DC output voltage, current, or power with an AC/DC power converter having an input rectifier, a single power processing stage consisting of a voltage boost function, a voltage chop function, at least one relay, a transformer with multiple inputs, an output rectifier, and a processor, the method comprising the steps of:
 a) applying the AC input voltage to the input rectifier to generate a DC input voltage;
 b) applying the DC input voltage to the voltage boost function of the single power processing stage;
 c) increasing the DC input voltage with the voltage boost function of the single power processing stage to generate a boost voltage;
 d) chopping the boost voltage with the voltage chop function of the single power processing stage to generate an AC voltage;
 e) selecting an input of the transformer with the relay;
 f) applying the AC voltage to the relay and the selected inputs of the transformer;
 g) inducing the AC voltage on to the secondary winding of the transformer;
 h) altering the amplitude of the AC voltage with the transformer in response to the input selected by the relays; and
 i) applying the transformer secondary winding voltage to the output rectifier to generate the regulated DC output voltage.

23. The method of claim 22 wherein step (d) comprises increasing the DC input voltage with power factor correction.

24. The method of claim 22 further comprising the step of applying the regulated DC output voltage to a battery pack for charging thereof.

* * * * *